(12) United States Patent
Liu

(10) Patent No.: US 7,033,058 B2
(45) Date of Patent: Apr. 25, 2006

(54) FLAT DISPLAY

(75) Inventor: Hong-Da Liu, Hsin-Chu Hsien (TW)

(73) Assignee: Wistron Optronics Corporation, Hsinchu (TW)

( * ) Notice: Subject to any disclaimer, the term of this patent is extended or adjusted under 35 U.S.C. 154(b) by 124 days.

(21) Appl. No.: 10/710,504

(22) Filed: Jul. 15, 2004

(65) Prior Publication Data
US 2005/0052884 A1 Mar. 10, 2005

(30) Foreign Application Priority Data
Sep. 10, 2003 (TW) .............................. 92125091 A

(51) Int. Cl.
*B64D 47/06* (2006.01)
(52) U.S. Cl. .......................... 362/559; 346/63; 346/49; 362/608
(58) Field of Classification Search ................ 362/561; 349/63, 65
See application file for complete search history.

(56) References Cited

U.S. PATENT DOCUMENTS 6,480,248 B1 * 11/2002 Lee et al. ..................... 349/96
6,768,529 B1 * 7/2004 Umemoto et al. .......... 349/114

FOREIGN PATENT DOCUMENTS

JP 10090678 A * 4/1998
JP 2001290445 A * 10/2001

* cited by examiner

Primary Examiner—Ali Alavi
Assistant Examiner—Hargobind S. Sawhney
(74) Attorney, Agent, or Firm—Winston Hsu

(57) ABSTRACT

A flat display displays images on both sides is disclosed. The flat display includes a liquid crystal molecule layer disposed between two substrates, and a driving array having a plurality of switch devices disposed on one of the substrates. Images are asynchronously displayed on both sides of the flat display by controlling a rotation state of the liquid crystal molecule layer by the driving array in cooperation with a light source provided by a light source module. The light source module includes two light-guiding plates. One of the light-guiding plates is disposed on the substrate having the driving array, and the other light-guiding plate is disposed on the other substrate having a color filter.

21 Claims, 16 Drawing Sheets

FLAT DISPLAY

BACKGROUND OF INVENTION

1. Field of the Invention

The present invention relates to a flat display, and more particularly, to a flat display that displays images on both sides.

2. Description of the Prior Art

Cell phone is a product that has grown very rapidly on the market within the past several years. Therefore, the flat display installed on the cell phone for displaying images becomes a very important device. In order to fulfill the requirements of user's habits and product innovation, manufacturing cell phones having the function of displaying images on both sides has become a trend. Furthermore, a modified notebook computer equipped with double display screens to display images on the inside and outside may become more and more popular. A flat display that can display images on both sides may be applied in other information products, such as a table PC, a large display screen, and other various hand-held apparatuses or digital products, in the future.

However, the current existing display apparatuses having the function of displaying images on both sides are fabricated by adhering two pieces of flat displays to each other back to back. Not only are the consumable parts wasted, but also at least twice the normal amount of electrical power needs to be supplied to the display apparatus to increase power consumption because two pieces of flat displays are utilized. When the display apparatus having the disadvantage of increased power consumption is applied in a cell phone, the power consumption of the cell phone is also increased so that users need to replace the batteries very frequently. Not only are energy resources wasted, but also inconvenience is brought to users. In addition, the display apparatus fabricated by sticking two flat displays back to back, having a large thickness and a heavy weight, cannot fulfill the requirements of a small size and a light weight, leading to difficulties when applying the display in portable electrical apparatuses.

SUMMARY OF INVENTION

It is therefore a primary objective of the claimed invention to provide a new display to resolve the above-mentioned problems. This new display should use only one piece of flat display to display images on both sides.

According to the claimed invention, a flat display comprises a liquid crystal molecule layer disposed between two substrates, and a driving array having a plurality of switch devices disposed on one of the substrates. Images are asynchronously displayed on both sides of the flat display by controlling a rotation state of the liquid crystal molecule layer by the driving array in cooperation with a light source provided by a light source module. The light source module comprises two light-guiding plates. One of the light-guiding plates is disposed on the substrate having the driving array, and the other light-guiding plate is disposed on the other substrate having a color filter.

It is an advantage over the prior art that the claimed invention flat display is thinner and lighter than the prior art flat display that is fabricated by adhering two pieces of flat displays to fulfill the requirements of a small size and a light weight. Furthermore, the cost is lowered. In addition, the present invention discloses directly fabricating light-guiding plates on glass substrates having a color filter and a driving array to further lower the manufacturing cost and decrease the thickness of the flat display.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
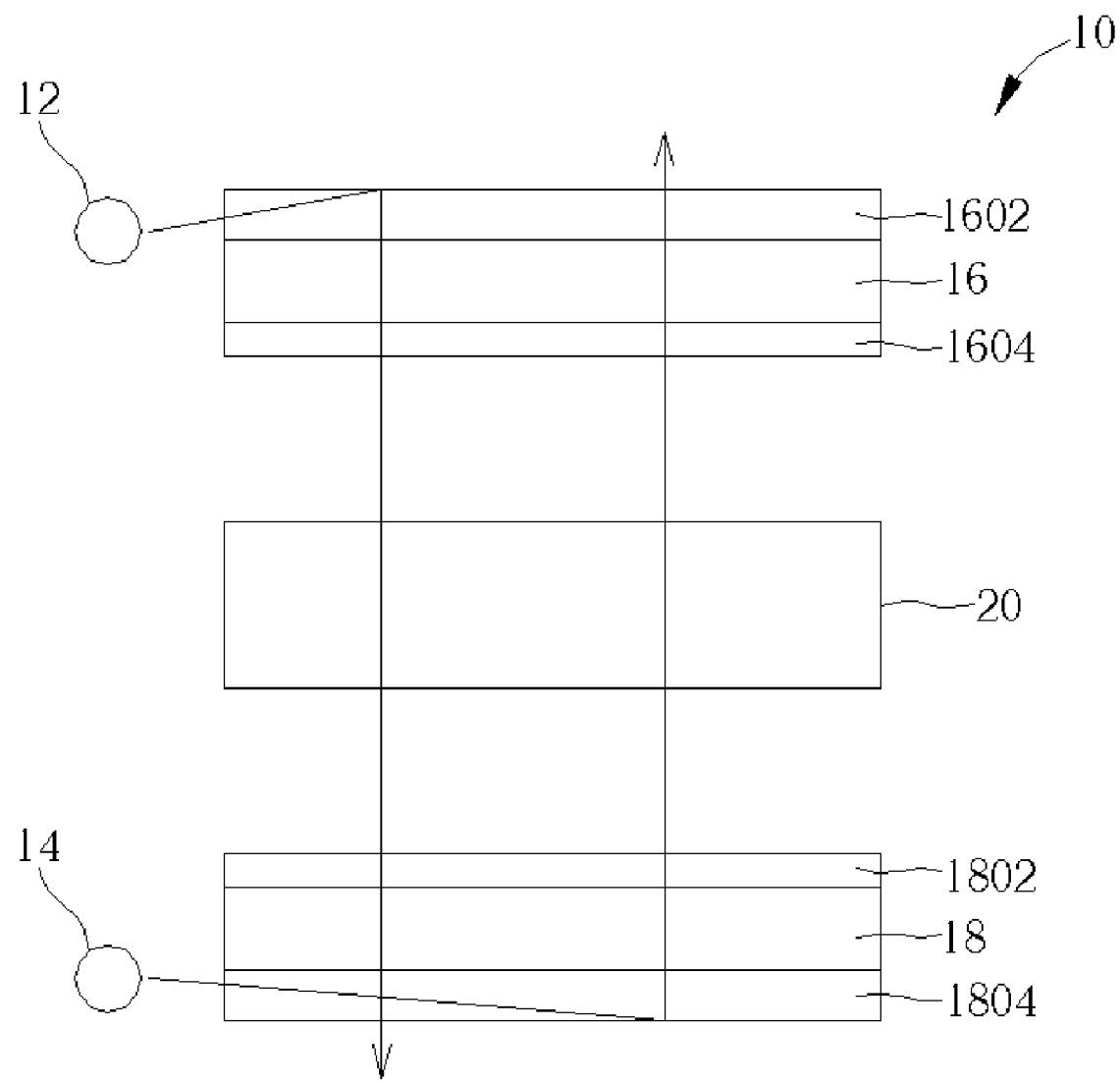
FIG. 1 and FIG. 2 are schematic diagrams illustrating the principle for present invention flat displays that display images on both sides.
Figure 2:
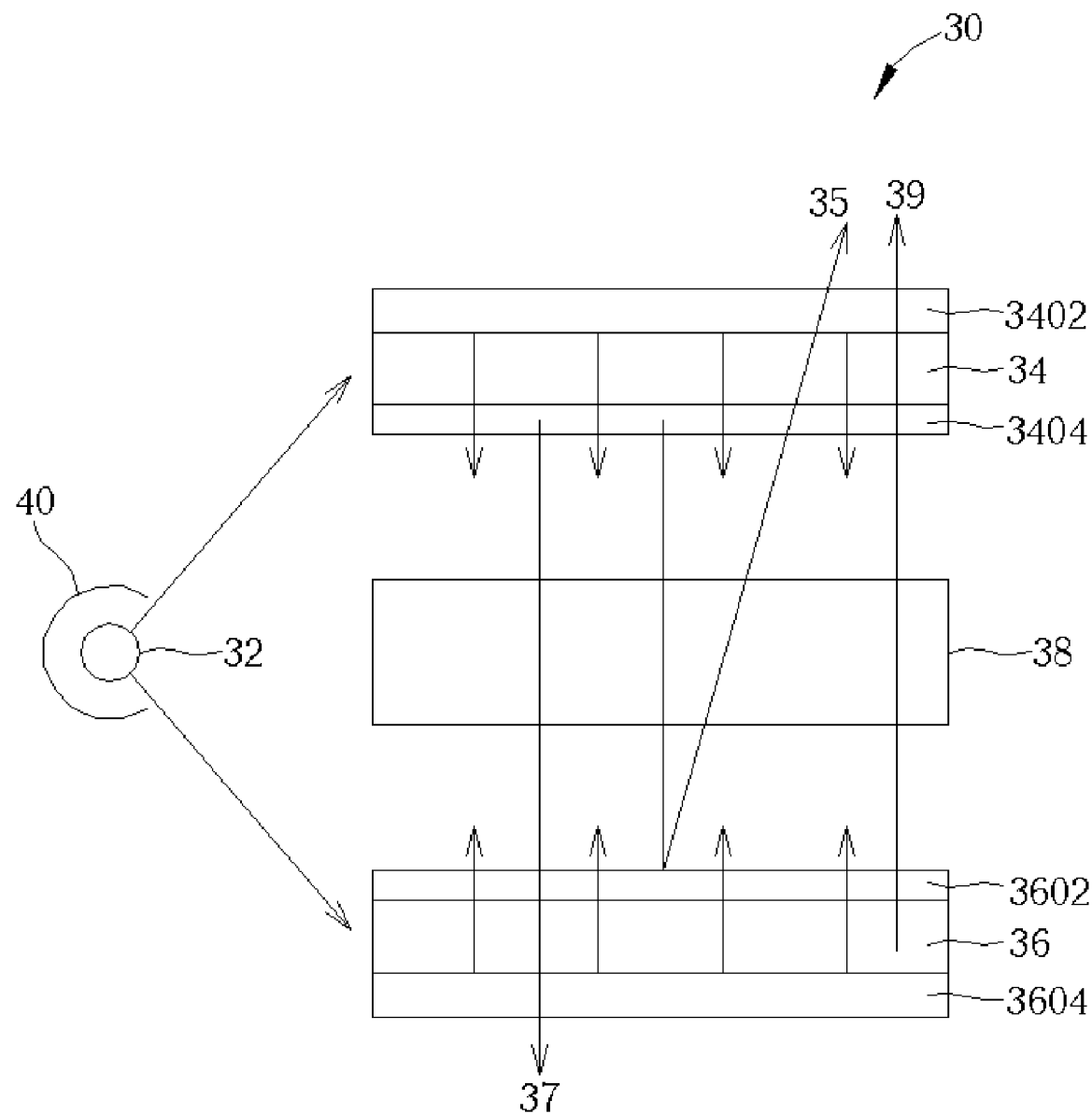

Please refer to FIG. 1 and FIG. 2. FIG. 1 and FIG. 2 are schematic diagrams illustrating the principle for present invention flat displays that display images on both sides. As shown in FIG. 1, the present invention flat display 10 is a transmissive flat display. The flat display 10 comprises a light source 12 and a light source 14, a substrate 16 and a substrate 18, and a liquid crystal molecule layer 20 disposed between the substrate 16 and the substrate 18. A light-guiding plate 1602 and a color filter 1604 are disposed on the substrate 16, and a driving array 1802 and a light-guiding plate 1804 are disposed on the substrate 18. Light beams emitted from the light sources 12, 14 are guided by the light-guiding plates 1602, 1804 disposed on the substrates 16, 18, respectively, to form two plane light sources to irradiate the liquid crystal molecule layer 20. Light beams provided by the light source 12 enter the liquid crystal molecule layer 20 after being guided by the light-guiding plate 1602 disposed on the substrate 16 so that images are displayed on the bottom side of the flat display 10. Light beams provided by the light source 14 enter the liquid crystal molecule layer 20 after they are guided by the light-guiding plate 1804 disposed on the substrate 18 so that images are displayed on the top side of the flat display 10. The present invention flat display may utilize a single light source to provide light beams required by the light-guiding plates disposed on the two substrates in another preferred embodiment of the present invention. As shown in FIG. 2, the present invention flat display 30 is a transflective flat display. The flat display 30 only utilizes a light source 32. Similarly, a liquid crystal molecule layer 38 is disposed between a substrate 34 and a substrate 36. A light-guiding plate 3402 and a color filter 3404 are disposed on the substrate 34, and a driving array 3602 and a light-guiding plate 3604 are disposed on the substrate 36. The driving array 3602 further comprises a light permeable region (not shown) and a reflective region (not shown). Light beams provided by the light source 32 are guided by the light-guiding plate 3402 disposed on the substrate 34 to generate a plane light source to enter the liquid crystal molecule layer 38. Portions of the light beams 35 are reflected by the reflective region (not shown) on the driving array 3602 disposed on the substrate 36 so that images are displayed on the top side of the flat display 30. Portions of the light beams 37 pass through the light permeable region (not shown) on the driving array 3602 disposed on the substrate 36 so that images are displayed on the bottom side of the flat display 30. The light-guiding plate 3604 disposed on the substrate 36 is underneath the driving array 3602. Light beams provided by the light source 32 are guided by the light-guiding plate 3604 disposed on the substrate 36 to form a plane light source. Portions of the light beams 39 pass through the light permeable region (not shown) on the driving array 3602 above them so that images are displayed on the top side of the flat display 30. Because only one light source is utilized, a lampshade 40 is installed at the outside of the light source 32. The light beams emitted from the light source 32 are thus reflected to the light-guiding plates 3402, 3604 disposed on the two substrates 34, 36. The lampshade 40 may be a switchable device such that it can be switched to face the substrate 34 or the substrate 36 in another preferred embodiment of the present invention. In another preferred embodiment of the present invention, the driving array 3602 disposed on the substrate 36 may comprise a partially transmissive and partially reflective region. Therefore, portions of the light beams coming from the top and the bottom pass through the partially transmissive and partially reflective region and portions of the light beams coming from the top and the bottom are reflected by the partially transmissive and partially reflective region to display images on both sides of the flat display 30. In another preferred embodiment of the present invention, a partially reflective film or a partially reflective layer may be disposed on the outside of the substrate 36.

In addition, each of the flat displays 10, 30 may be a twisted nematic liquid crystal display (TN-LCD), a super twisted nematic liquid crystal display (STN-LCD), a thin film transistor liquid crystal display (TFT-LCD), a thin film diode liquid crystal display (TFD-LCD), a low temperature polysilicon thin film transistor liquid crystal display (LTPS TFT-LCD), an electrophoretic liquid crystal display, or liquid crystal displays of other modes, including reflective super twisted nematic (RSTN) mode, reflective twisted nematic (RTN) mode, reflectively electrically controlled birefringence (RECB) mode, mixed-mode twisted nematic (MTN) mode, and vertical alignment mode (VA). Moreover, the light-guiding plates are not limited in being disposed on the substrates having the color filter and the driving array, they can be directly fabricated on the glasses having the color filter and the driving array to further lower the manufacturing cost and decrease the thickness of the flat display, according to the present invention.

Figure 3:
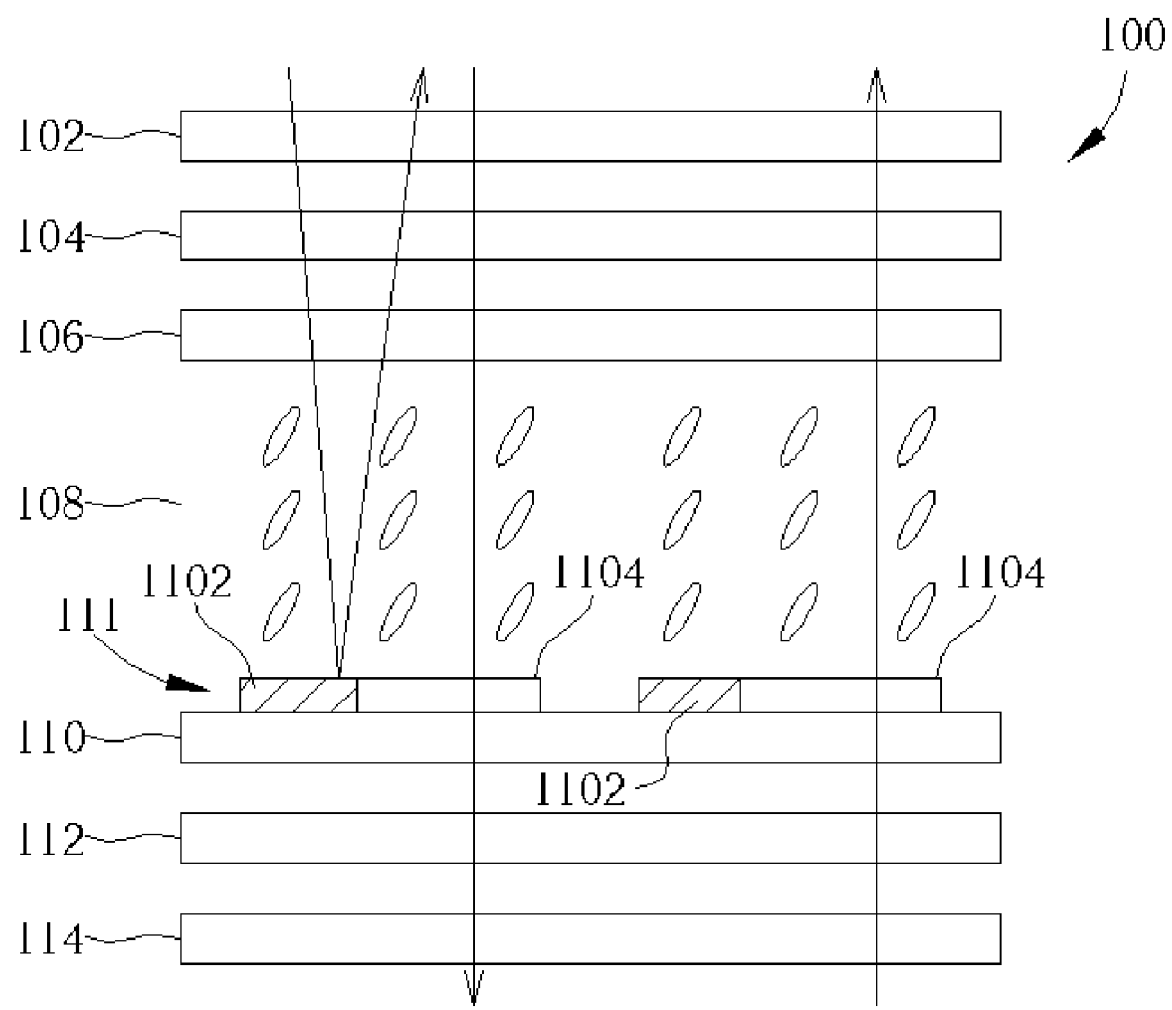
FIG. 3 is a schematic diagram of a transreflective liquid crystal display according to a first preferred embodiment of the present invention.
Figure 4:
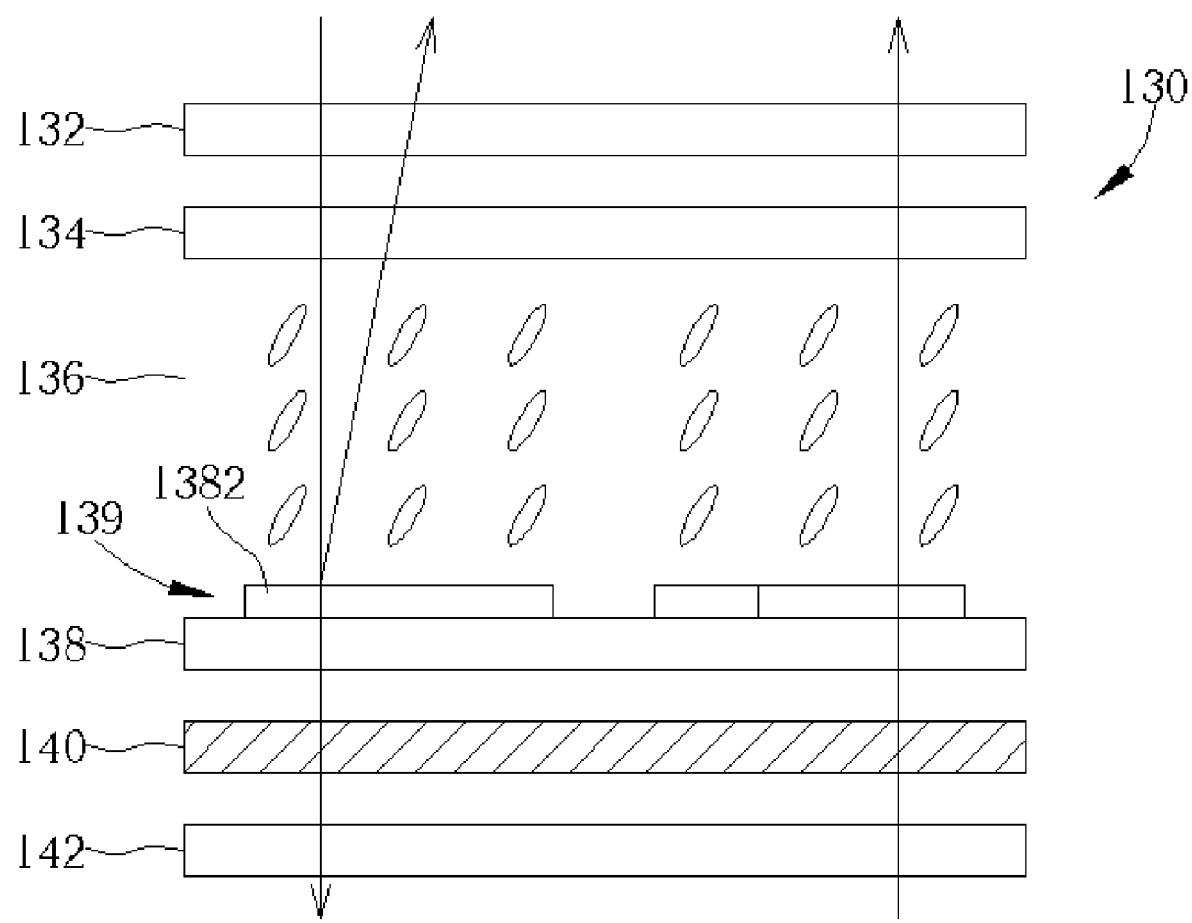
FIG. 4 is a schematic diagram of a transreflective liquid crystal display according to a second preferred embodiment of the present invention.

Please refer to FIG. 3 and FIG. 4. FIG. 3 is a schematic diagram of a transflective liquid crystal display 100 according to a first preferred embodiment of the present invention. FIG. 4 is a schematic diagram of a transreflective liquid crystal display 130 according to a second preferred embodiment of the present invention. As shown in FIG. 3, a liquid crystal display 100 comprises a polarization film 102, a compensation film 104, a color filter 106, a layer of liquid crystal molecules 108, a substrate 110 having a driving array 111, a compensation film 112, and a polarization film 114. The pixel array 111 on the substrate 110 comprises many switch devices (not shown), and each of the switch devices controls a rotation state of the liquid crystal molecules 108 within a corresponding pixel. A reflective region 1102 and a light permeable region 1104 are included in one pixel on the driving array 111. Light beams are reflected to the outside of the polarization film 102 by the reflective region 1102 and reach the polarization film 114 through the light permeable region 1104. The above-mentioned light-guiding plates may be disposed on the outside of the polarization films 102, 114. As shown in FIG. 4, a liquid crystal display 130 comprises a polarization film 132, a color filter 134, a layer of liquid crystal molecules 136, a substrate 138 having a driving array 139, a partially reflective film 140, and a polarization film 142. Only a light permeable region 1382 is included in the driving array 139 disposed on the substrate 138. Light beams pass through the light permeable region 1382 and reach the partially reflective film 140, then portions of the light beams are reflected to the outside of the polarization film 132 and portions of the light beams pass through the polarization film 142. The above-mentioned light-guiding plates may be disposed on the outside of the polarization films 132, 142.

Figure 5:
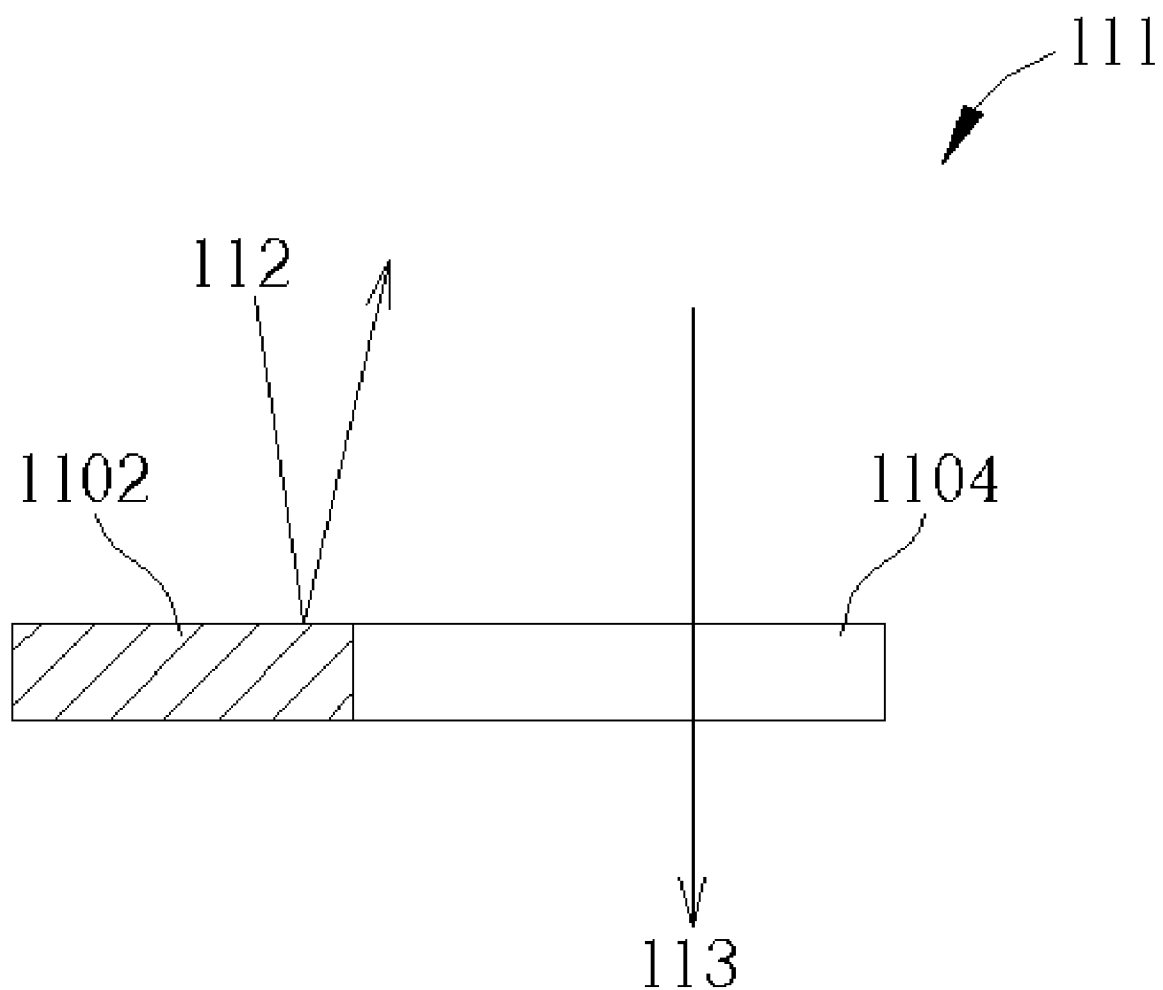
FIG. 5 is a schematic diagram of an optical configuration of the driving array disposed on the substrate shown in FIG. 3.
Figure 6:
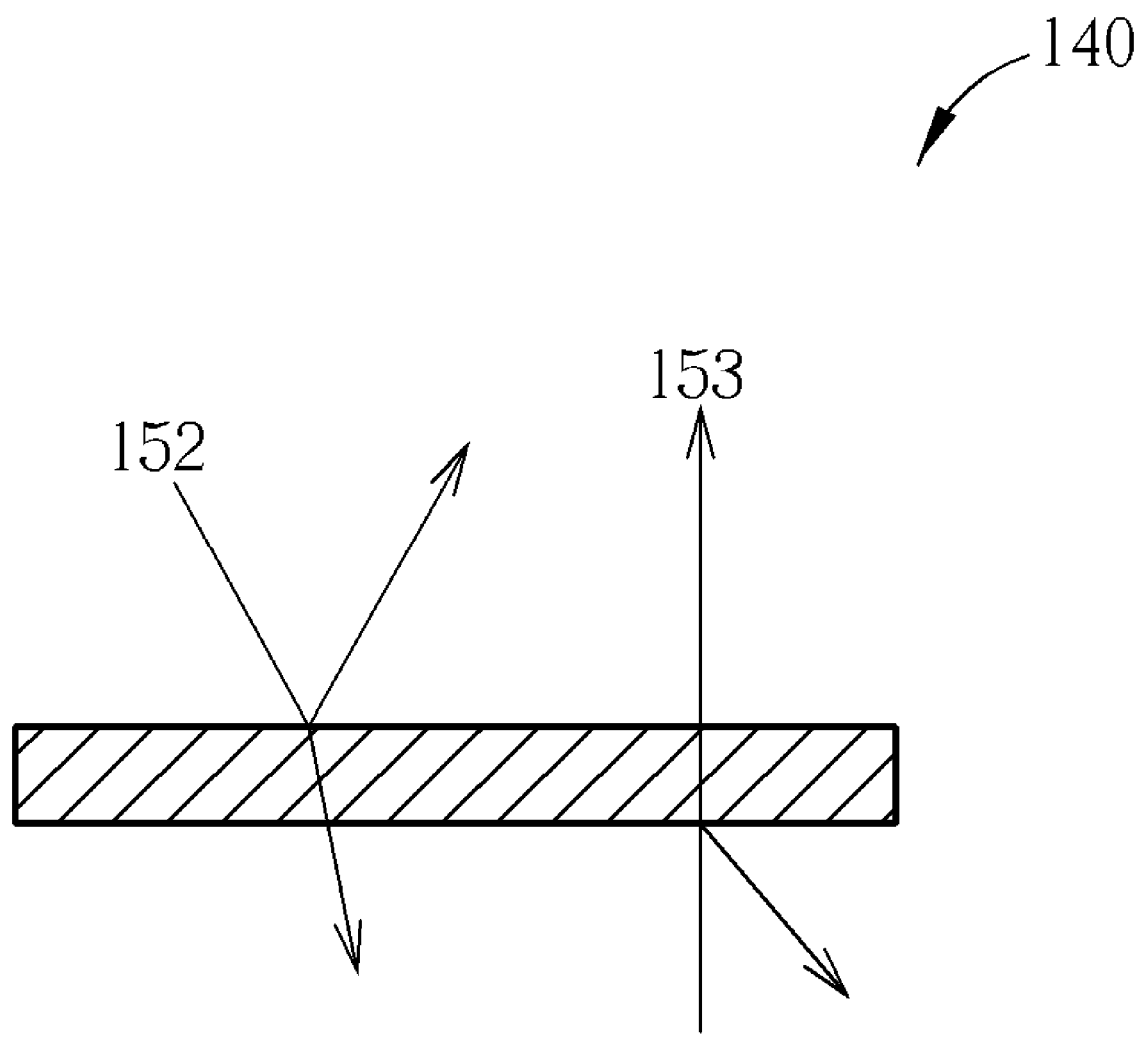
FIG. 6 is a schematic diagram of an optical configuration of the partially reflective film disposed on the outside of the substrate shown in FIG. 4.
Figure 7:
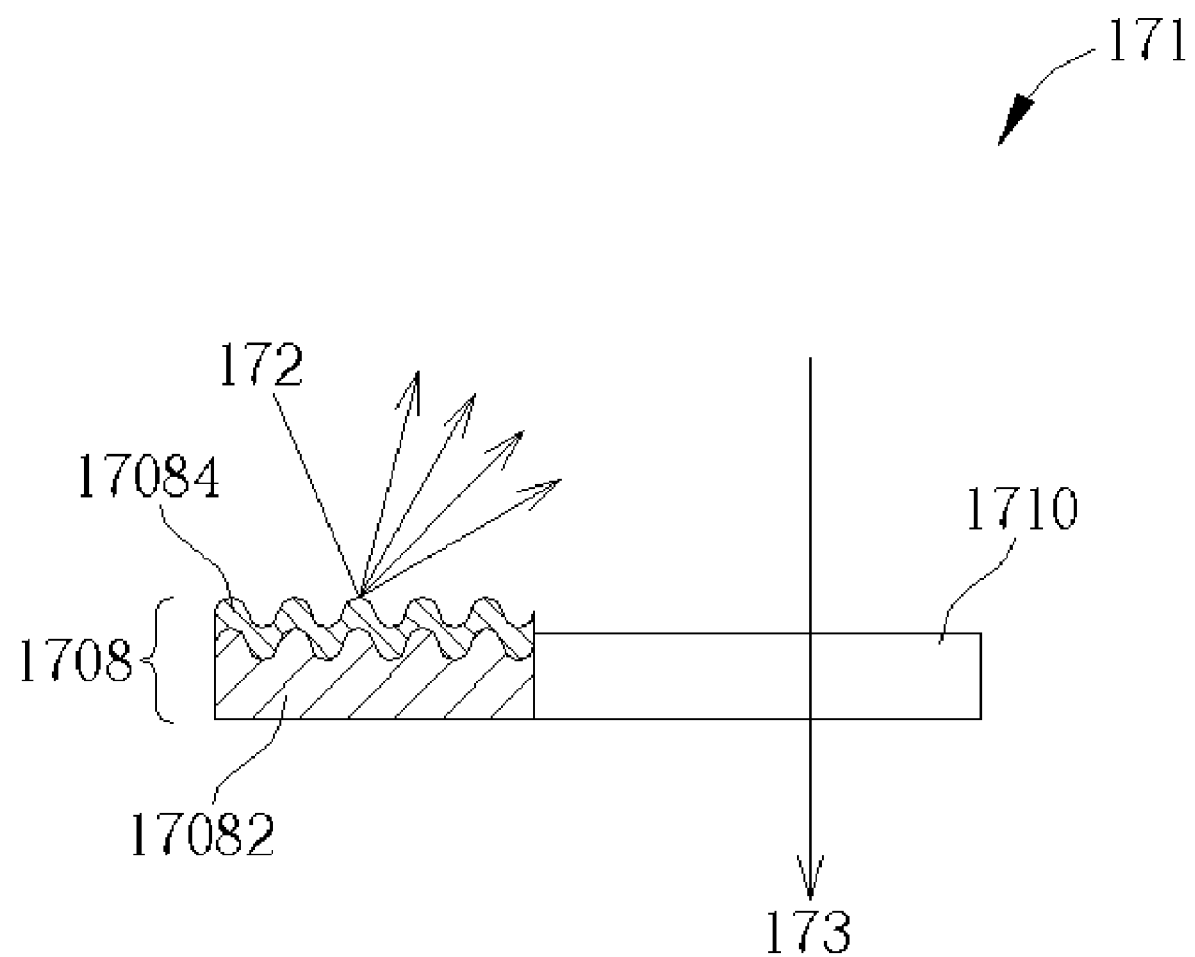
FIG. 7 is a schematic diagram of another optical configuration of a driving array disposed on a substrate.

Please refer to FIG. 5 to FIG. 7. FIG. 5 is a schematic diagram of an optical configuration of the driving array 111 disposed on the substrate shown in FIG. 3. FIG. 6 is a schematic diagram of an optical configuration of the partially reflective film disposed on the outside of the substrate shown in FIG. 4. FIG. 7 is a schematic diagram of another optical configuration of a driving array 171 disposed on a substrate. As shown in FIG. 5, a reflective region 1102 and a light permeable region 1104 are included in one pixel on the driving array 111 disposed on the substrate (not shown). Therefore, light beams 112 are reflected by the reflective region 1102, and light beams 113 pass through the light permeable region 1104. As shown in FIG. 6, the partially reflective film 140 disposed on the outside of the substrate has the function of partial transmission and partial reflection. For example, a metal thin film may be deposited on a substrate to fabricate the partially reflective film 140. Therefore, portions of light beams 152 reaching the partially reflective film 140 are reflected, and portions of light beams 153 reaching the partially reflective film 140 pass through the partially reflective film 140. The ratio of the light beams 152 being reflected by the partially reflective film 140 to the light beams 153 passing through the partially reflective film 140 can be controlled by adjusting the thickness of the metal thin film. As shown in FIG. 7, a scattering reflective region 1708 and a light permeable region 1710 are included in a pixel on the driving array 171 disposed on the substrate (not shown). The scattering effect of the reflective region 1708 can be achieved by utilizing a micro roughness surface or mirror-like reflectance. A scattering reflectance thus occurs when the light beams 172 are reflected by the reflective region 1708. At the same time, the light beams 173 pass through the light permeable region 1710. If the reflective region 1708 is achieved by utilizing a micro roughness surface, a rough layer 17082 and a reflective layer 17084 are included in the reflective region 1708. The material composition of the rough layer 17082 comprises silicon nitride, silicon oxide, or silicon oxynitride, and the micro roughness surface is formed on a surface of the rough layer 17082. The reflective layer 17084 is composed of materials having a high reflectance factor, such as high-reflection metals or multi-layered films. Typically, aluminum, silver, or alloys of them are utilized. Both the rough layer 17082 and the reflective layer 17084 are used for reflecting the light beams 172.

The color filter utilized in the present invention may be a dual color filter. When the color filter is a dual color filter, the color filter corresponding to the reflective region and the color filter corresponding to the light permeable region are designed based on the number of times that light beams are reflected. In addition, color filters having different thickness, different chromaticity, and different materials may be utilized to form color filters having different colors. In addition, color filters having different colors may be formed by color mixing. These skills are all well known by those of ordinary skill in the art.

Figure 8:
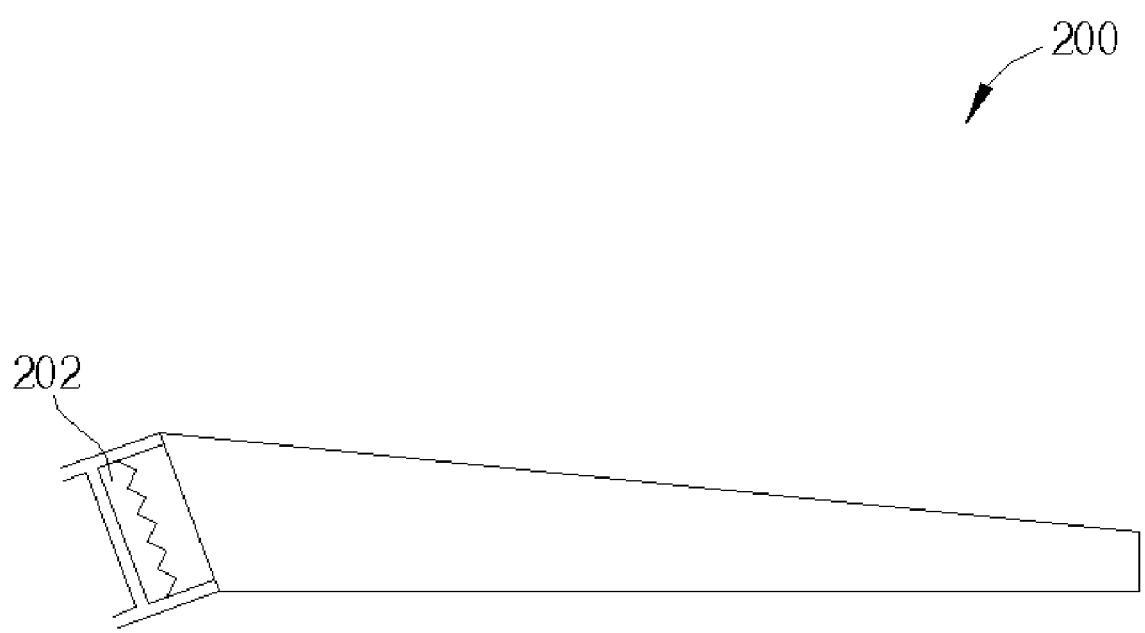
FIG. 8 to FIG. 10 are structural schematic diagrams of light-guiding plates according to the present invention.
Figure 9:
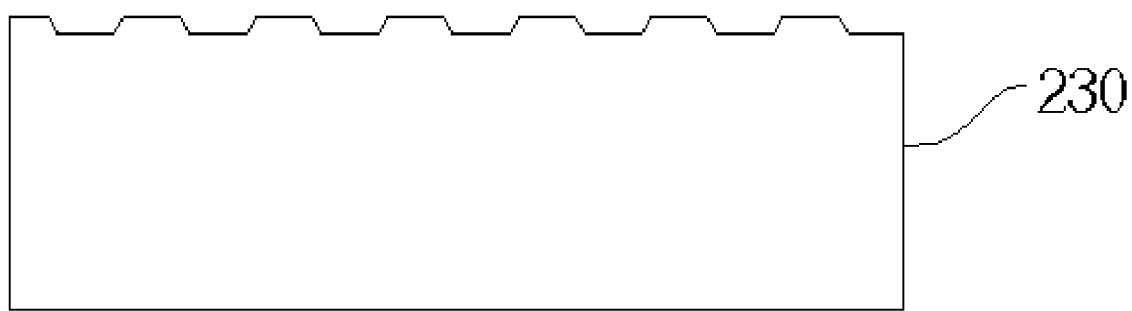
Figure 10:
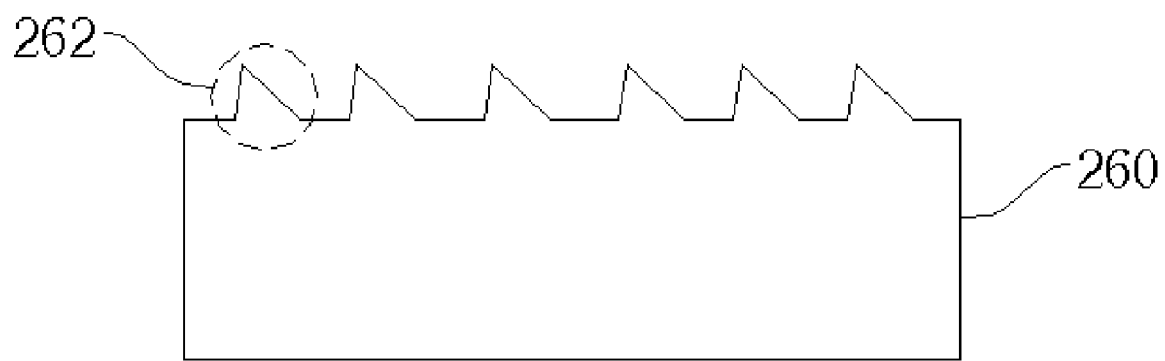

Please refer to FIG. 8 to FIG. 10. FIG. 8 to FIG. 10 are structural schematic diagrams of light-guiding plates according to the present invention. The light-guiding plate 200 having a tilt angle is shown in FIG. 8, the planer zigzag light-guiding plate 230 is shown in FIG. 9, and another planer zigzag light-guiding plate 260 is shown in FIG. 10. The light-guiding plate 200 having a tilt angle comprises a prism 202 for guiding light beams provided by the light source to the light-guiding plate 200. Surfaces of both the planer zigzag light-guiding plate 230 and the planer zigzag light-guiding plate 260 are zigzag scattering surfaces. The spacing between two adjacent zigzag structures is not necessarily equal to that between two other adjacent zigzag structures. Actually, the spacing is designed according to practical requirements.

Figure 11:
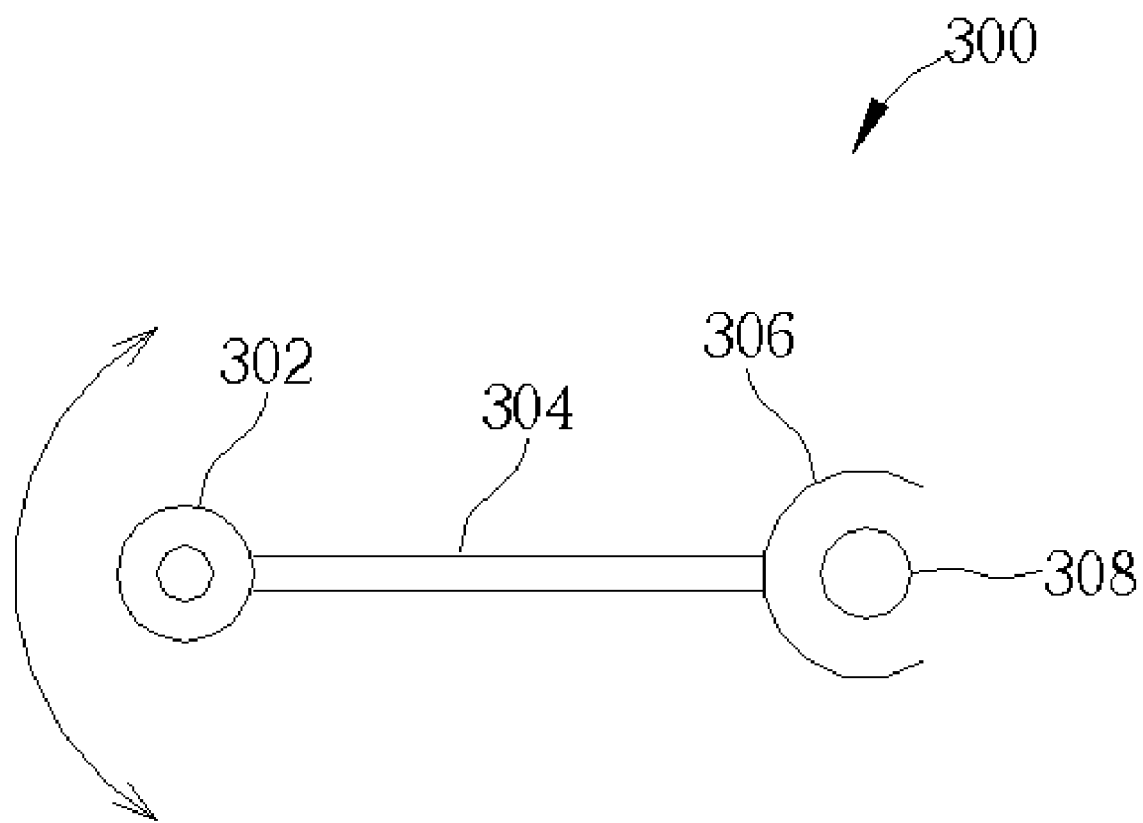
FIG. 11 and FIG. 12 are schematic diagrams of a switch device of a light source module according to the present invention.
Figure 12:
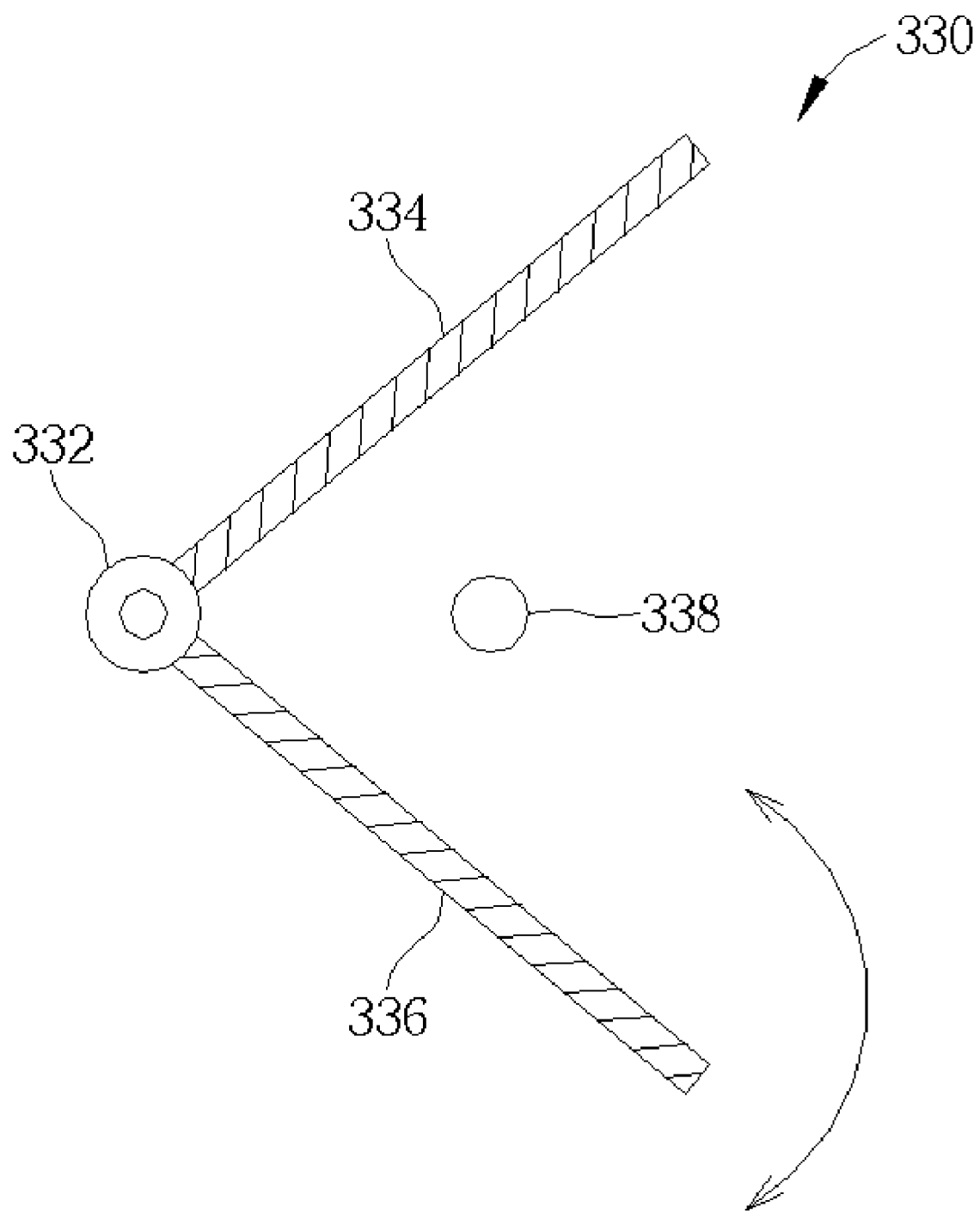

Please refer to FIG. 11 and FIG. 12. FIG. 11 and FIG. 12 are schematic diagrams of a switch device of a light source module according to the present invention. As shown in FIG. 11, the switch device of the light source module 300 comprises a switch 302, a stand 304, and a lampshade 306. The lampshade 306 is used as a reflective plate to reflect light beams emitted from reflective light source 308. When the present invention flat display utilizes a single light source in cooperation with two light-guiding plates, the switch 302 can switch a direction of the lampshade 306 such that the light beams required by different light-guiding plates are provided by the light source 308. As shown in FIG. 12, the switch device of the light source module 330 comprises a switch 332 and reflective plates 334, 336. The reflective plates 334, 336 are used for reflecting light beams emitted from the light source 338. Similarly, the switch 332 can switch a direction of the reflective plates 334, 336 such that the light beams required by different light-guiding plates are provided by the light source 338 when the present invention flat display utilizes a single light source in cooperation with two light-guiding plates.

Figure 13:
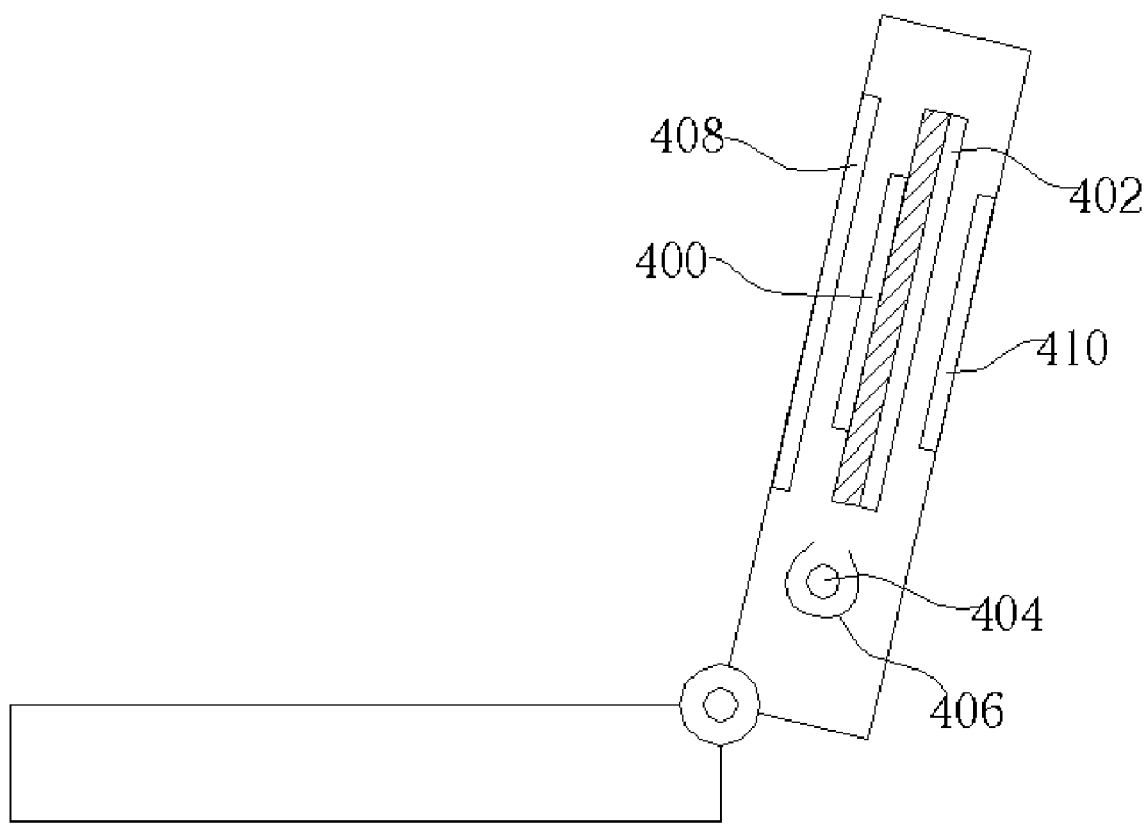
FIG. 13 and FIG. 14 are schematic diagrams illustrating a present invention flat display applied in a cell phone.
Figure 14:
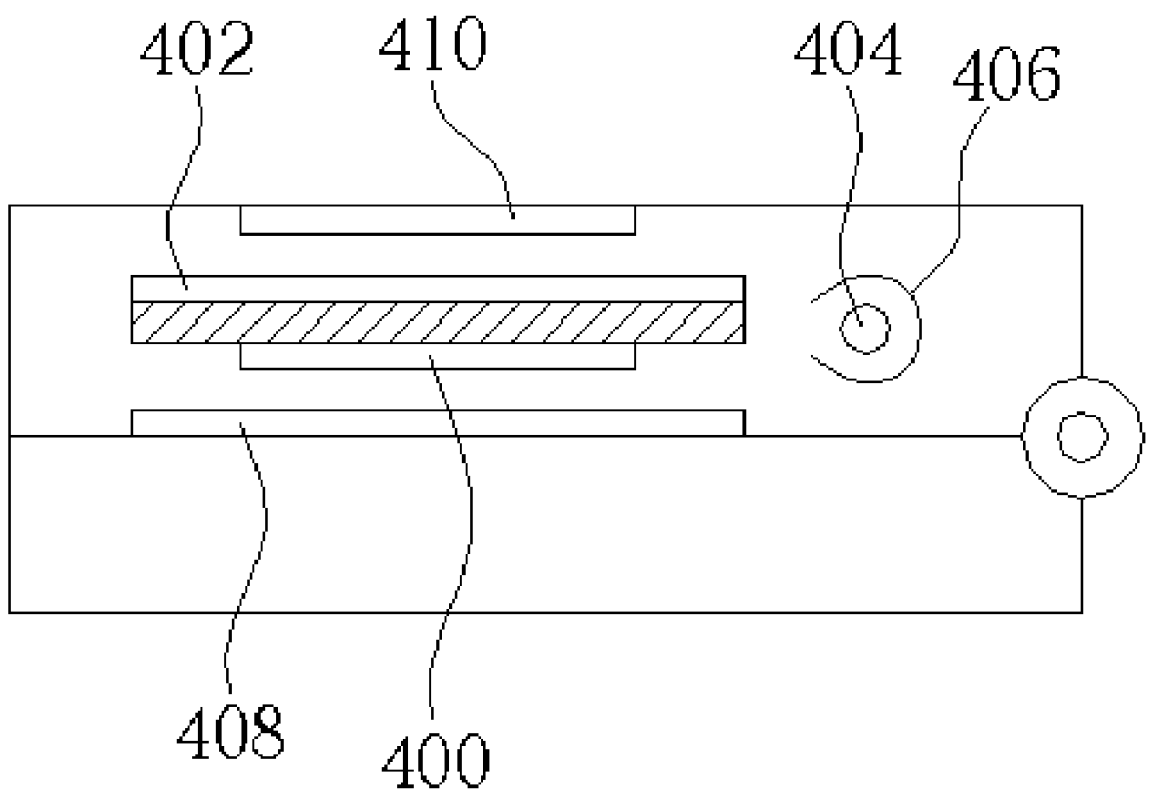

Please refer to FIG. 13 and FIG. 14. FIG. 13 and FIG. 14 are schematic diagrams illustrating a present invention flat display applied in a cell phone. As shown in FIG. 13, the present invention flat display comprises light-guiding plates 400, 402, a light source 404, and a lampshade 406. The lampshade 406 is a part of a switch device of a light source module, and a switch is utilized to switch a direction of the lampshade 406. When the cell phone is opened, the switch switches the lampshade 406 to face the light-guiding plate 402 to allow the light source 404 to provide light beams to the light-guiding plate 402. Images are thus displayed on an inner side 408 of the flat display. Oppositely, the switch switches the lampshade 406 to face the other light-guiding plate 400 to allow the light source 404 to provide light beams to the light-guiding plate 400 when the cell phone is opened, as shown in FIG. 14. Images are thus displayed on an outer side 410 of the flat display. In another preferred embodiment of the present invention, two light sources are included in light source facilities of a cell phone. When the cell phone is opened, a switch is triggered to fire one of the light sources so that images are displayed on an inner side of the flat display in cooperation with one light-guiding plate. Oppositely, the switch is triggered to fire the other light source so that images are displayed on an outer side of the flat display in cooperation with the other light-guiding plate when the cell phone is closed. Similarly, the present invention flat display may be applied in a notebook computer, a table PC, a large display screen, and other digital products if a digital module is equipped to connect to the present invention flat display to drive the present invention flat display to display images.

Figure 15:
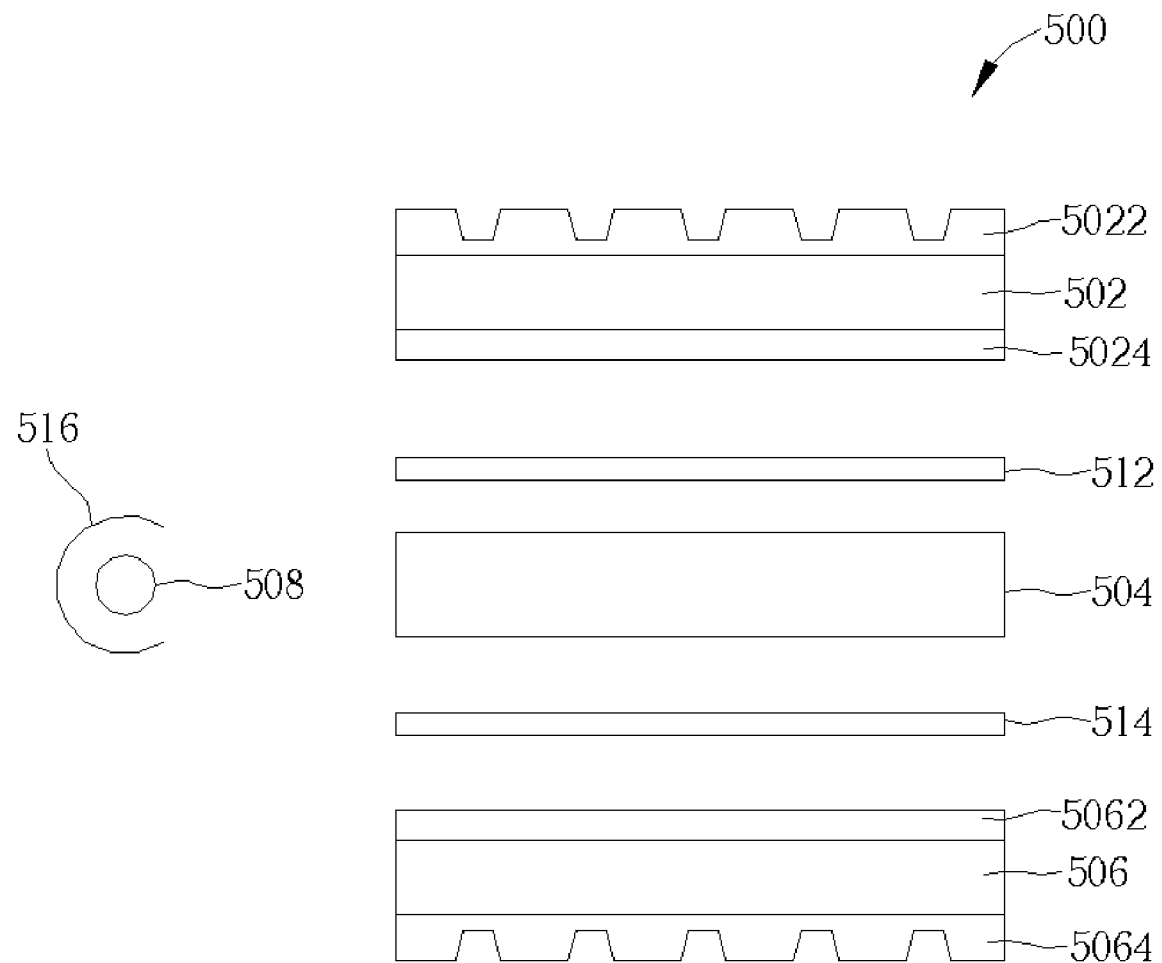
FIG. 15 is a schematic diagram of an optical configuration of a present invention flat display.

Please refer to FIG. 15. FIG. 15 is a schematic diagram of an optical configuration of a present invention flat display 500. As shown in FIG. 15, the present invention flat display 500 comprises a substrate 502, a liquid crystal molecule layer 504, a substrate 506, and a light source 508. The substrate 502, having a light-guiding plate 5022 and a color filter 5024 on it, is on the top of the liquid crystal molecule layer 504. The other substrate 506, having a driving array 5062 and a light-guiding plate 5064, is at the bottom of the liquid crystal molecule layer 504. The light source 508 provides light beams required by the two light-guiding plates 5022, 5064. The flat display 500 is a transmissive flat display. The light-guiding plates 5022, 5064 are respectively disposed on the glass plates having the color filter 5024 and the driving array 5062 on them. The driving array 5062 is used for controlling a rotation state of the liquid crystal molecules in the liquid crystal molecule layer 504. The flat display 500 further comprises polarization, compensation, and alignment layers 512, 514 disposed between the substrate 502 and the liquid crystal molecule layer 504 and between the liquid crystal molecule layer 504 and the substrate 506, respectively. The alignment layer, for example: the product produced by Optiva Co., is formed by mixing absorption molecules with an alignment film, and is used for aligning the liquid crystal molecules in the liquid crystal molecule layer 504 along its direction. A lampshade 516 surrounds the light source 508 and reflects the light beams. The lampshade 516 is a part of a switch device of a light source module. The lampshade 516 is thus rotated to raise the utility of the light source 508 by operating a switch of the switch device of the light source module.

Figure 16:
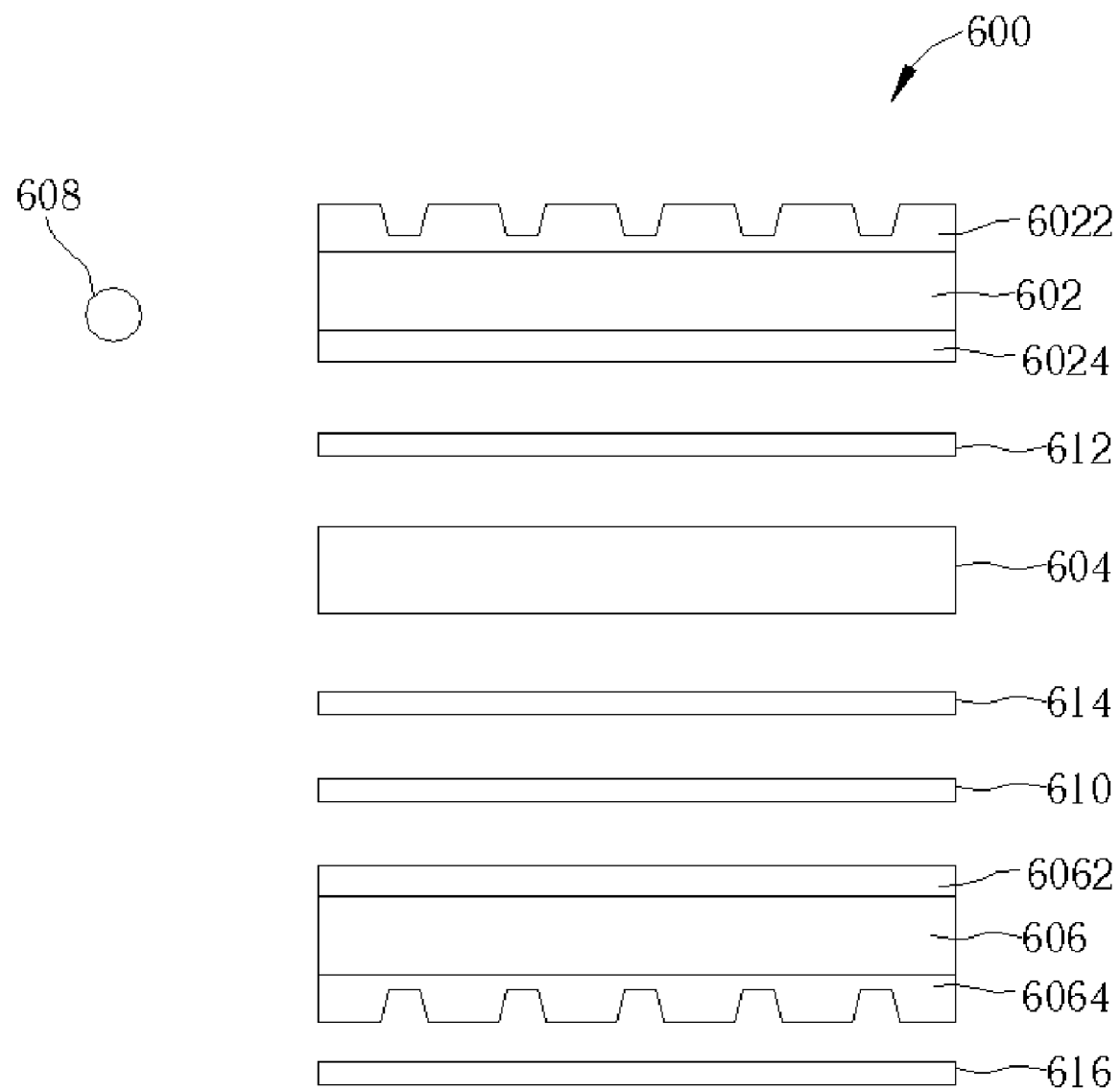
FIG. 16 is a schematic diagram of another optical configuration of a present invention flat display.

Please refer to FIG. 16. FIG. 16 is a schematic diagram of another optical configuration of a present invention flat display 600. As shown in FIG. 16, the present invention flat display 600 comprises a substrate 602, a liquid crystal molecule layer 604, a substrate 606 having a pixel array 6062, a light source 608, and a semi-reflective film 610. The substrate 602, having a light-guiding plate 6022 and a color filter 6024 on it, is on the top of the liquid crystal molecule layer 604. The substrate 606 is at the bottom of the liquid crystal molecule layer 604. The light source 608 provides light beams required by the light-guiding plate 6022. The light-guiding plate 6022 is disposed on the glass plate having the color filter 6024 on it. The driving array 6062 disposed on the substrate 606 further comprises a light permeable region, and the semi-reflective film 610 is disposed between the liquid crystal molecule layer 604 and the driving array 6062. Therefore, portions of the light beams coming from the light-guiding plate 6022 are reflected by the semi-reflective film 610 to display images on a top side of the flat display 600, and portions of the light beams coming from the light-guiding plate 6022 pass through the semi-reflective film 610 to display images on a bottom side of the flat display 600. The flat display 600 further comprises a polarization, compensation, and alignment layer 612 disposed between the substrate 602 and the liquid crystal molecule layer 604, and an alignment layer 614 disposed between the liquid crystal molecule layer 604 and the semi-reflective film 610. The alignment layer in the polarization, compensation, and alignment layer 612 and the alignment layer 614, for example: the product produced by Optiva Co, are formed by mixing absorption molecules with an alignment film, and are used for aligning the liquid crystal molecules in the liquid crystal molecule layer 604 along their direction. The flat display 600 may utilize only one light-guiding plate 6022 or two light-guiding plates 6022, 6064. When two light-guiding plates are utilized, the light-guiding plates 6022, 6064 are respectively disposed on the glass plates having the color filter 6024 and the driving array 6062. At this time, a single light source or two light sources may be utilized to provide the light beams required by the light-guiding plate 6022 and the light-guiding plate 6064. When a single light source is utilized, the above-mentioned switch device of a light source module is installed at the circumference of the light source to raise the utility of light source.

Compared to the prior art, the claimed invention flat display is thinner and lighter than the prior art flat display that is fabricated by adhering two pieces of flat displays to fulfill the requirements of a small size and a light weight. Furthermore, the cost is lowered. In addition, the present invention discloses directly fabricating light-guiding plates on glass substrates having a color filter and a driving array to further lower the manufacturing cost and decrease the thickness of the flat display.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A flat display comprising:
   a liquid crystal molecule layer disposed between a first substrate and a second substrate;
   a driving array disposed on the second substrate to control a rotation state of the liquid crystal molecule layer; and
   a light source module having a first light source, a first light-guiding plate disposed on the first substrate, and a second light-guiding plate disposed on the second substrate;
   wherein the light source module is used to provide light beams such that a first image is displayed on a first side of the flat display and a second image is displayed on a second side of the flat display in cooperation with the rotation state of the liquid crystal molecule layer.

2. The flat display of claim 1 wherein the flat display further comprises a switch device of the light source module for switching an irradiation direction of the first light source to provide light beams to the first light-guiding plate and the second light-guiding plate.

3. The flat display of claim 2 wherein the switch device of the light source module comprises a switch and at least a reflective plate.

4. The flat display of claim 3 wherein the switch is connected to a cover, the switch switches the reflective plate to rotate to a first direction when the cover is closed such that the first image is displayed on the first side of the flat display in cooperation with the second light-guiding plate, and the switch switches the reflective plate to rotate to a second direction when the cover is opened such that the second image is displayed on the second side of the flat display in cooperation with the first light-guiding plate.

5. The flat display of claim 4 wherein the first side and the first light-guiding plate are on a same side of the flat display, and the second side and the second light-guiding plate are on another side of the flat display.

6. The flat display of claim 4 wherein the flat display is installed on the cover.

7. The flat display of claim 4 wherein the flat display is connected to a module, and the module comprises a cell phone module or a computer module.

8. The flat display of claim 4 wherein the flat display is connected to a digital module, and the digital module is used to drive the flat display to display images.

9. The flat display of claim 1 wherein the flat display further comprises a second light source and a switch.

10. The flat display of claim 9 wherein the first light source is used to provide light beams to the first light-guiding plate, and the second light source is used to provide light beams to the second light-guiding plate.

11. The flat display of claim 10 wherein the switch is connected to a cover, the switch switches the first light source to be fired when the cover is closed to provide light beams to the first light-guiding plate such that the second image is displayed on the second side of the flat display, and the switch switches the second light source to be fired when the cover is opened to provide light beams to the second light-guiding plate such that the first image is displayed on the first side of the flat display.

12. The flat display of claim 11 wherein the first side and the first light-guiding plate are on a same side of the flat display, and the second side and the second light-guiding plate are on another side of the flat display.

13. The flat display of claim 11 wherein the flat display is installed on the cover.

14. The flat display of claim 11 wherein the flat display is connected to a module, and the module comprises a cell phone module or a computer module.

15. The flat display of claim 11 wherein the flat display is connected to a digital module, and the digital module is used to drive the flat display to display images.

16. The flat display of claim 1 wherein the driving array further comprises a light permeable region, the light beams guided by the first light-guiding plate pass through the light permeable region to display the second image, and the light beams guided by the second light-guiding plate pass through the light permeable region to display the first image.

17. The flat display of claim 16 wherein a semi-reflective film is disposed on the second substrate on a same side as the second light-guiding plate, wherein the light beams guided by the first light-guiding plate pass the light permeable region and are reflected by the semi-reflective film to display the first image, the light beams guided by the first light-guiding plate pass the light permeable region and the semi-reflective film to display the second image, and the light beams guided by the second light-guiding plate pass through the semi-reflective film to display the first image.

18. The flat display of claim 16 wherein a semi-reflective film is disposed between the driving array and the liquid crystal molecule layer, wherein the light beams guided by the first light-guiding plate pass through the semi-reflective region to display the second image, and the light beams guided by the first light-guiding plate are reflected by the semi-reflective film to display the first image.

19. The flat display of claim 1 wherein the driving array further comprises a reflective region, the light beams guided by the first light-guiding plate are reflected by the reflective region to display the first image.

20. The flat display of claim 1 wherein the driving array further comprises a partially transmissive and partially reflective region, the light beams guided by the first light-guiding plate are reflected by the partially transmissive and partially reflective region to display the first image, the light beams guided by the first light-guiding plate pass through the partially transmissive and partially reflective region to display the second image, and the light beams guided by the second light-guiding plate pass through the partially transmissive and partially reflective region to display the first image.

21. The flat display of claim 1 wherein both the first light-guiding plate and the second light-guiding plate comprise a light-guiding plate having a tilt angle or a planer zigzag light-guiding plate.

* * * * *